Nov. 20, 1928.  
C. T. PFLUEGER ET AL  
1,692,466  
LEVEL WIND MECHANISM FOR FISHING REELS  
Filed April 30, 1926

Inventors  
Charles T. Pflueger and  
Walter L. Adams  
By Brockett + Hyde  
Attorneys.

Patented Nov. 20, 1928.

1,692,466

UNITED STATES PATENT OFFICE.

CHARLES T. PFLUEGER AND WALTER L. ADAMS, OF AKRON, OHIO, ASSIGNORS TO THE ENTERPRISE MANUFACTURING COMPANY, OF AKRON, OHIO, A CORPORATION OF OHIO.

LEVEL-WIND MECHANISM FOR FISHING REELS.

Application filed April 30, 1926. Serial No. 105,711.

This invention relates to improvements in fishing reels and more particularly, in reel level wind mechanism of the type including a reversely threaded shaft rotatably mounted in the reel end heads and having a line guiding carriage mounted thereon for sliding movement therealong, said carriage having operative connection with said shaft by means of a pawl arranged within an opening or recess in said carriage.

Heretofore, said pawl has been confined within said carriage opening and in engagement with said reversely threaded shaft by a plug member threadedly secured within the outer portion of said opening. As this carriage opening must of necessity be of rather limited size, and since the pawl and its confining plug are both arranged within the opening, said pawl and said plug member have had to be quite small, with the result that they have been troublesome to manufacture, extremely inconvenient to handle in assembly and disassembly of this part of the level wind mechanism, and more or less unsatisfactory in use, as the threads of both the plug member and the carriage have had to be so small and of such slight extent that durable securement of the plug member within the carriage opening was not afforded.

The object of the present invention is to improve this part of the level wind mechanism by the provision of a cup-shaped pawl-confining member adapted for securement to the external surface of the line guiding carriage by threads of sufficient size and extent to afford a firm and durable connection. The entire carriage opening or recess is therefore available for the shaft engaging pawl so that said pawl can be made much larger and a long bearing for said pawl in said opening is afforded. Moreover, the cup shape of this pawl-confining member enables it to be utilized as an oil reservoir so that the reversely threaded shaft and the parts associated therewith can be easily and simply kept lubricated.

Further objects of the invention are in part obvious and in part will appear more in detail hereinafter.

Figure 1:
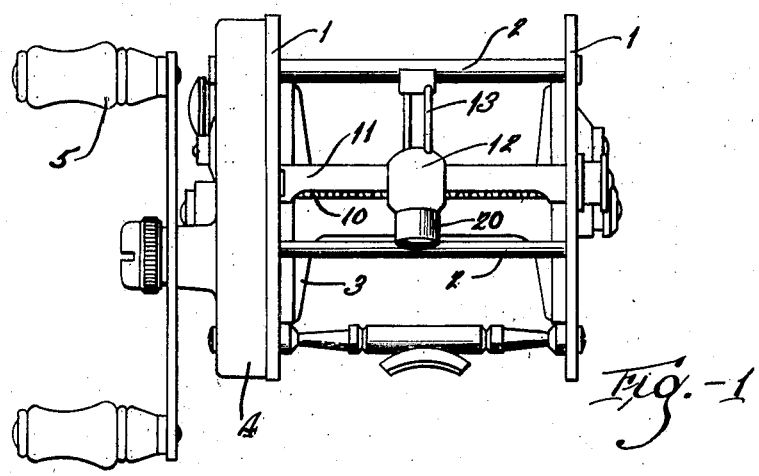
Figure 2:
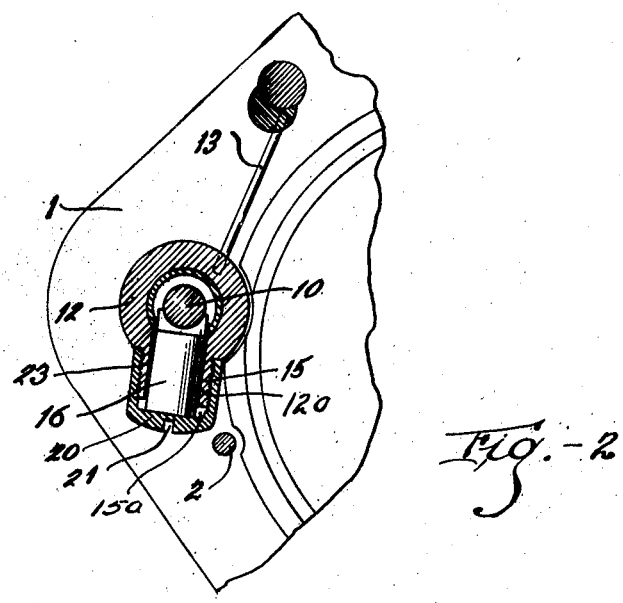

In the drawings, Fig. 1 is a front elevation of a fishing reel embodying our invention; and Fig. 2 is a detail sectional view on the line 2—2, Fig. 1.

Referring to the drawings, the reel therein illustrated includes the usual end heads 1 connected by pillars 2 and between which end heads rotates a spool 3 upon which the fishing line is adapted to be wound. The spool is operated by suitable gearing within the gear casing 4 attached to one of the reel end heads, said gearing being operated by the usual handle 5.

The level wind mechanism of the reel includes a reversely threaded shaft 10 rotatably mounted in the reel end heads and operatively connected to the gearing in casing 4. Said shaft is preferably enclosed within a slotted protecting tube 11, upon which is sleeved for sliding movement therealong the substantially spherical body portion 12 of a line guiding carriage, said body portion being provided with line guiding arms or pins 13 and a substantially cylindrical hollow extension 12$^a$. The substantially spherical shape of the carriage body portion not only renders this part of the level wind mechanism free of all sharp corners or line cutting edges, but also provides a strong and sturdy carriage which is economical to manufacture. The chamber or recess 15 within the carriage extension 12$^a$ is adapted to receive a pawl 16 engaging said reversely threaded shaft through the slot in tube 11, the engagement of said pawl with said shaft effecting the back and forth travel of the line guiding carriage upon rotation of said shaft, as is usual. Said pawl and said carriage opening are of sufficient length that a long, firm bearing is afforded said pawl in said opening, said pawl being slightly longer than said opening so that when in engagement with the reversely threaded shaft, said pawl projects slightly beyond the carriage, as clearly indicated in Fig. 2.

Said pawl is normally confined within the carriage opening and in engagement with the reversely threaded shaft by a cup-shaped member 20 removably secured to the external surface of the line guide carriage. In the embodiment of the invention here illustrated, the cylindrical extension 12$^a$ of the carriage is provided with external threads for co-operation with the internal threads of said pawl-confining member, the threads of both parts being of sufficient size and longitudinal extent to enable the pawl-confining member to be firmly and durably secured to the carriage. Preferably said pawl-confining member is provided in its end wall with a screw driver slot 21 to facilitate the application of said member to the carriage and its removal therefrom.

The cup shape of the pawl-confining member enables it to be utilized as an oil reservoir, a pocket or chamber 15$^a$ being provided for the oil in the outer end of the carriage extension recess 15. This oil pocket is formed in the present embodiment of the invention by the projection of the outer end of pawl 16 beyond the carriage extension, the space around said projecting pawl end constituting or forming the oil pocket. A slight clearance 23 between the pawl and the cylindrical wall of the carriage extension permits the oil to flow from pocket 15$^a$ to the reversely threaded shaft so that said shaft, the protecting tube 11 therefor and the carriage pawl 16 are easily and simply maintained in a well lubricated condition.

What we claim is:

1. Level wind mechanism for fishing reels, comprising a reversely threaded shaft, a line guiding carriage mounted upon said shaft and adapted for movement back and forth therealong, said carriage being provided with an opening, a pawl removably positioned within said opening and adapted for engagement with said shaft, and means threaded to the external surface of said carriage for confining said pawl within said opening in engagement with said shaft.

2. Level wind mechanism for fishing reels, comprising a reversely threaded shaft, a line guiding carriage mounted upon said shaft and adapted for movement back and forth therealong, said carriage being provided with an opening, a pawl removably positioned within said opening and adapted for engagement with said shaft, and a cup-shaped member secured to the external surface of said carriage for confining said pawl within said opening in engagement with said shaft.

3. Level wind mechanism for fishing reels, comprising a reversely threaded shaft, a line guiding carriage mounted upon said shaft and adapted for movement back and forth therealong, said carriage being provided with an opening, a pawl removably positioned within said opening and adapted for engagement with said shaft, and a cup-shaped member threaded to the external surface of said carriage for confining said pawl within said opening in engagement with said shaft.

4. Level wind mechanism for fishing reels, comprising a threaded shaft, a line guiding carriage slidable upon said shaft and provided with a hollow extension threaded externally, a pawl arranged in said extension for engagement with said shaft, and a cup shaped member mounted upon said carriage extension for confining said pawl within said extension and in engagement with said shaft, said cup shaped member having an oil receiving chamber when assembled with said carriage in such pawl confining position.

5. Level wind mechanism for fishing reels, comprising a threaded shaft, a line guiding carriage slidable upon said shaft and provided with a hollow extension threaded externally, a pawl arranged in said extension for engagement with said shaft and having an end portion projecting beyond said extension, a cup shaped member mounted upon said extension and engaging the projecting end of said pawl and thereby maintaining said pawl in engagement with the threaded shaft, and an oil chamber in the outer end portion of said cup shaped member surrounding the projecting end of said pawl.

6. Level wind mechanism for fishing reels, comprising a threaded shaft, a line guiding carriage slidable upon said shaft and provided with an externally threaded hollow extension, a pawl arranged in said extension for engagement with said shaft and having an end portion projecting beyond said extension, a cup shaped member threaded upon said extension and engaging the projecting end of said pawl and thereby maintaining said pawl in engagement with the threaded shaft, and an oil chamber between the outer end of said carriage extension and the inner surface of the substantially circular end wall of said cup shaped member.

7. Level wind mechanism for fishing reels, comprising a reversely threaded shaft, a line guide carriage mounted upon said shaft and adapted for movement therealong, said carriage being provided with an opening, a pawl removably positioned within said opening and adapted for engagement with said shaft, and a cup-shaped member secured to said carriage for confining said pawl within said opening in engagement with said shaft.

In testimony whereof we hereby affix our signatures.

CHARLES T. PFLUEGER.
WALTER L. ADAMS.